United States Patent
Takahashi et al.

(10) Patent No.: US 12,097,805 B2
(45) Date of Patent: Sep. 24, 2024

(54) OPTICAL SYSTEM, IMAGE PICKUP APPARATUS, IN-VEHICLE SYSTEM, AND MOVING APPARATUS

(71) Applicant: CANON KABUSHIKI KAISHA, Tokyo (JP)

(72) Inventors: Makoto Takahashi, Tochigi (JP); Shin Kuwashiro, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 232 days.

(21) Appl. No.: 17/580,906

(22) Filed: Jan. 21, 2022

(65) Prior Publication Data

US 2022/0234504 A1    Jul. 28, 2022

(30) Foreign Application Priority Data

Jan. 27, 2021    (JP)  .............................. JP2021-011187

(51) Int. Cl.
*B60R 1/23*          (2022.01)
*G02B 3/04*          (2006.01)
*G02B 9/64*          (2006.01)

(52) U.S. Cl.
CPC .................. *B60R 1/23* (2022.01); *G02B 3/04* (2013.01); *G02B 9/64* (2013.01); *B60R 2300/301* (2013.01)

(58) Field of Classification Search
CPC ........... G06K 9/00201; G06K 9/00778; G06K 9/00785; G06K 9/00791; G06K 9/00798; G06K 9/00805; G06K 9/00812; G06K 9/00818; G06K 9/00825; G06K 9/00845; G06K 9/325; G06K 2209/15; G06K 2209/23; B60R 2300/301; B60R 2001/1215; B60R 2025/1013; B60R 2025/1016; B60R 2300/105; B60R 2300/8033; B60R 2300/106; B60R 2300/806; B60R 2300/8066; B60R 2300/8073; B60R 2300/8086; B60R 2300/8093; B60R 1/23;
(Continued)

(56) References Cited

U.S. PATENT DOCUMENTS

| 10,310,240 B2 | 6/2019 | Kuwashiro |
| 10,330,901 B2 | 6/2019 | Kuwashiro |

(Continued)

FOREIGN PATENT DOCUMENTS

| EP | 2708931 A1 * | 3/2014 | ............ G02B 13/06 |
| JP | 2018087938 A * | 6/2018 | ......... G02B 13/0045 |

(Continued)

OTHER PUBLICATIONS

Extended European Search Report issued by the European Patent Office on May 18, 2022 in corresponding EP Patent Application No. 22152952.2.

*Primary Examiner* — Nathnael Aynalem
(74) *Attorney, Agent, or Firm* — Carter, DeLuca & Farrell LLP

(57) ABSTRACT

An optical system includes, in order from an enlargement conjugate side to a reduction conjugate side, a front unit including three or more lenses, a diaphragm, and a rear unit including a plurality of lenses. The front unit includes a first positive lens closest to an enlargement conjugate position, and a second positive lens. A predetermined condition is satisfied.

19 Claims, 10 Drawing Sheets

(58) Field of Classification Search
CPC ........... G06T 2207/30236; G06T 2207/30248;
G06T 2207/30252; G06T 2207/30256;
G06T 2207/30261; G06T 2207/30264;
G06T 2207/30268; G08G 1/16; G08G
1/116; G08G 1/167; G08G 1/168; G08G
1/20; B60W 50/14; B60W 2050/143;
B60W 2550/10; B60W 2550/14; G01S
17/93; G01S 17/931; B62D 15/029;
H04W 4/40; G02B 5/005; G02B 27/14;
G02B 13/18; G02B 13/0045; G02B
15/1461; G02B 9/64; G02B 15/145;
G02B 27/0025; G02B 13/0035; G02B
13/009; G02B 15/1421; G02B 15/143;
G02B 13/16; G02B 13/004; G02B 13/22;
G02B 13/003
USPC ......... 348/148, 139; 359/714–716, 740, 763,
359/764, 773
See application file for complete search history.

(56) References Cited

U.S. PATENT DOCUMENTS

| | | |
|---|---|---|
| 10,338,359 B2 | 7/2019 | Kuwashiro et al. |
| 10,663,842 B2 | 5/2020 | Takahashi |
| 11,029,586 B2 | 6/2021 | Takahashi |
| 2009/0201590 A1* | 8/2009 | Sugita .................... G02B 13/04 359/708 |
| 2012/0236122 A1* | 9/2012 | Fukawa ............... H04N 23/743 348/148 |
| 2017/0153430 A1 | 6/2017 | Iijima et al. |
| 2018/0299655 A1 | 10/2018 | Kuwashiro |
| 2021/0124156 A1 | 4/2021 | Takahashi |
| 2022/0050284 A1* | 2/2022 | Yamamoto ........... G02B 23/243 |
| 2022/0214521 A1* | 7/2022 | Yang ....................... G02B 9/64 |

FOREIGN PATENT DOCUMENTS

| | | |
|---|---|---|
| JP | 2020-056849 A | 4/2020 |
| JP | 2020064179 A | 4/2020 |

* cited by examiner

OPTICAL SYSTEM, IMAGE PICKUP APPARATUS, IN-VEHICLE SYSTEM, AND MOVING APPARATUS

BACKGROUND OF THE INVENTION

Field of the Invention

The present invention relates to an optical system suitable for an image pickup apparatus, such as an in-vehicle camera.

Description of the Related Art

The in-vehicle camera is utilized to acquire image data around a vehicle and to enable a user to visually recognize other vehicles and obstacles. Such an in-vehicle camera often includes a plurality of types of optical systems such as a fisheye lens that realizes a wide field of view although the resolution is low, and a telephoto lens that realizes a high resolution by magnifying a distance although the angle of view is narrow. Japanese Patent Laid-Open Nos. ("JPs") 2018-087938 and 2020-056849 disclose optical systems having a projection characteristic as a combination of characteristics of both the fisheye lens and the telephoto lens.

However, the optical system disclosed in JP 2018-087938 has a small angle of view and the front unit includes two lenses, so that the sufficient projection characteristic and high image quality cannot be realized. The optical system disclosed in JP 2020-056849 has a small angle of view, and the lens configuration is not optimal for realizing a projection characteristic compatible with a fisheye lens and a telephoto lens.

SUMMARY OF THE INVENTION

The present invention provides an optical system having a projection characteristic compatible with both a fisheye lens and a telephoto lens, a sufficient angle of view, and a sufficient resolution.

An optical system according to one aspect of the present invention includes, in order from an enlargement conjugate side to a reduction conjugate side, a front unit including three or more lenses, a diaphragm, and a rear unit including a plurality of lenses. The front unit includes a first positive lens closest to an enlargement conjugate position, and a second positive lens. A projection characteristic y(θ) of the optical system that represents a relationship between an angle of view θ and an image height y satisfies the following inequality:

$$1.80 \leq f \sin \theta max / y(\theta max) \leq 4.50$$

where θmax is a maximum half angle of view of the optical system, and f is a focal length of the optical system.

An image pickup apparatus according to another aspect of the present invention includes the above optical system, and an image sensor configured to image an object via the optical system. An in-vehicle system according to another aspect of the present invention includes the above image pickup apparatus, and a determiner configured to determine a likelihood of collision between a vehicle and the object based on distance information of the object acquired by the image pickup apparatus. A moving apparatus according to another aspect of the present invention includes the above image pickup apparatus and is movable while holding the image pickup apparatus.

Further features of the present invention will become apparent from the following description of exemplary embodiments with reference to the attached drawings.

DESCRIPTION OF THE EMBODIMENTS

Referring now to the accompanying drawings, a description will be given of embodiments according to the present invention. Prior to a specific description of Examples 1 to 3, matters common to each example will be described.

An optical system according to each example is suitable for an image pickup apparatus such as a digital still camera, a digital video camera, an in-vehicle camera, a mobile phone camera, a surveillance camera, a wearable camera, and a medical camera.

Figure 1:
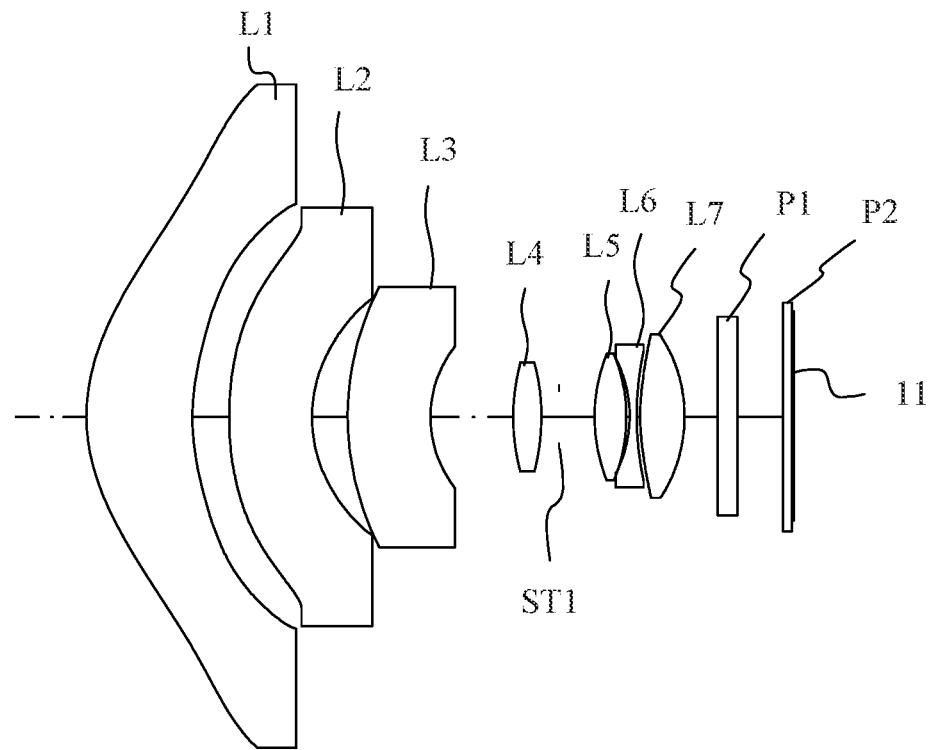
FIG. 1 is a sectional view of an optical system according to Example 1.
Figure 5:
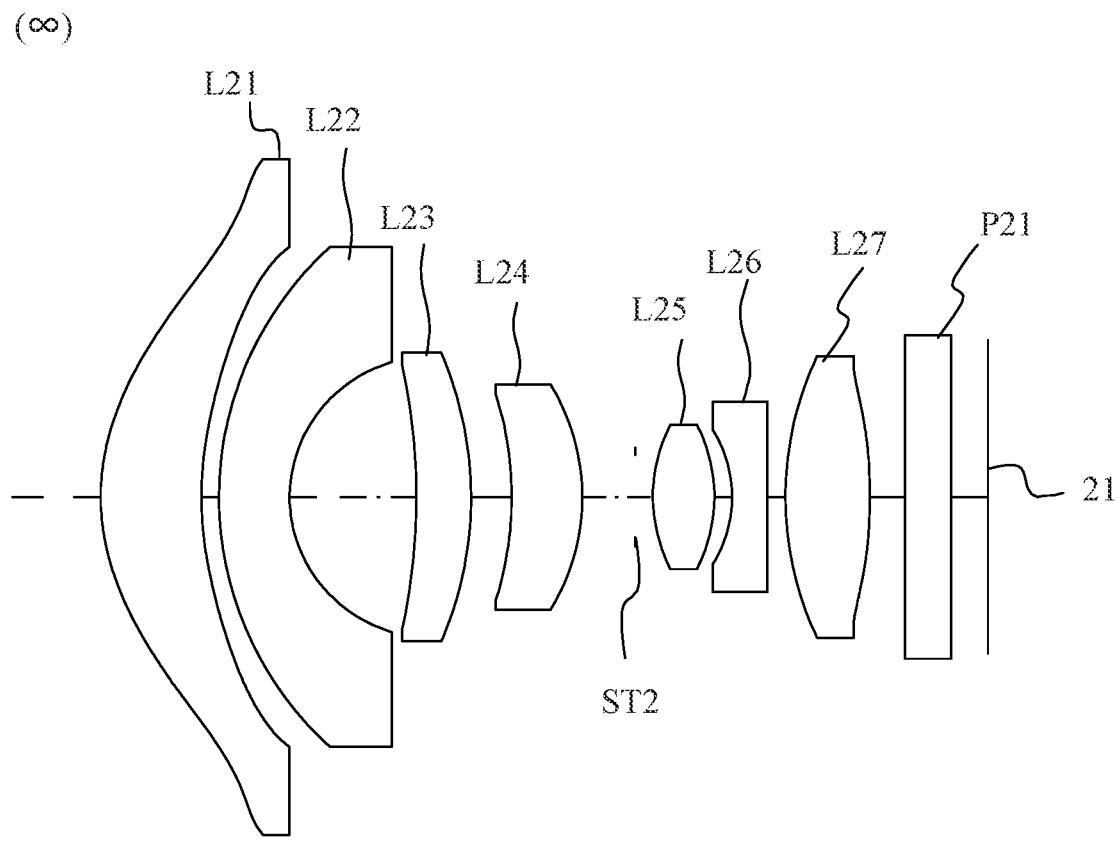
FIG. 5 is a sectional view of an optical system according to Example 2.
Figure 9:
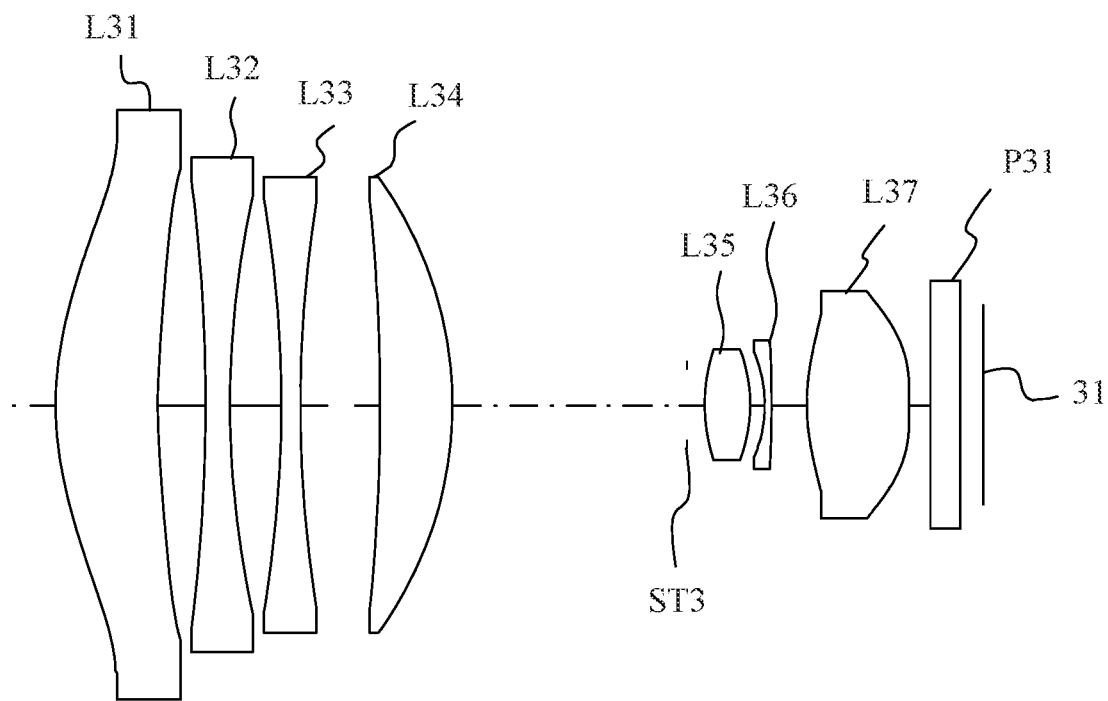
FIG. 9 is a sectional view of an optical system according to Example 3.

FIGS. 1, 5, and 9 illustrate sections that contain an optical axis (alternate long and short dash line) of optical systems according to Examples 1, 2, and 3, respectively. Each figure illustrates a state where an imaging distance of the optical system is at infinity (∞).

In each figure, a left side is an enlargement conjugate side (object side), and a right side is a reduction conjugate side. In each figure, a left side is an enlargement conjugate side (image side). The optical system according to each example is an imaging optical system that collects a light beam from an unillustrated object located on the enlargement conjugate side to form an object image on an image plane 11, 21, or 31 on the reduction conjugate side. An imaging plane (light-receiving surface) of an image sensor such as a CCD sensor and a CMOS sensor is disposed on the image plane. However, the optical system according to each example can be a projection optical system of a projector that projects a light beam from a spatial light modulation element such as a liquid crystal panel disposed on the reduction conjugate side, onto a projected surface such as a screen disposed on the enlargement conjugate side. In the following description, the optical system is used as an imaging optical system of an in-vehicle camera.

The optical system according to each example includes, in order from the enlargement conjugate side to the reduction conjugate side, a front unit including three or more lenses, a diaphragm (aperture stop) ST1, ST2, or ST3, and a rear unit including a plurality of lenses. The lens L1, L21, or L31 closest to the enlargement conjugate position in the front unit is a lens having a positive refractive power (positive lens). The optical system according to each example although configured as a single optical system has a sufficient angle of view and a sufficient peripheral resolution, secures a sufficient central resolution, and thus possesses a lens configuration suitable for obtaining a good optical performance over the entire angle of view. In the optical system according to each example, the front unit includes at least one lens having a negative refractive power (negative lens), and a lens closest to the reduction conjugate side in the front unit is set to a positive lens.

In the following description, the unit length per 1 deg of the angle of view is defined as the resolution (mm/deg), and a relationship between an image height y and an angle of view $\theta$ is defined as a projection characteristic $y(\theta)$. For example, a general f$\theta$ lens has a constant resolution at each image height and possesses a proportional projection characteristic. An angle formed by the optical axis and the outermost principal ray is defined as a maximum half angle of view.

In the optical system according to each example, in the in-vehicle camera, a first area (central area) near the optical axis is used to monitor the front distant view, and a second area (peripheral area) on an off-axis side (periphery side) of the first area is used for the front view. A high resolution is available at an angle of view corresponding to the first area by the telephoto function, and a sufficient angle of view and a good optical performance over the entire angle of view are available in the second area by the fisheye function.

Figure 3:
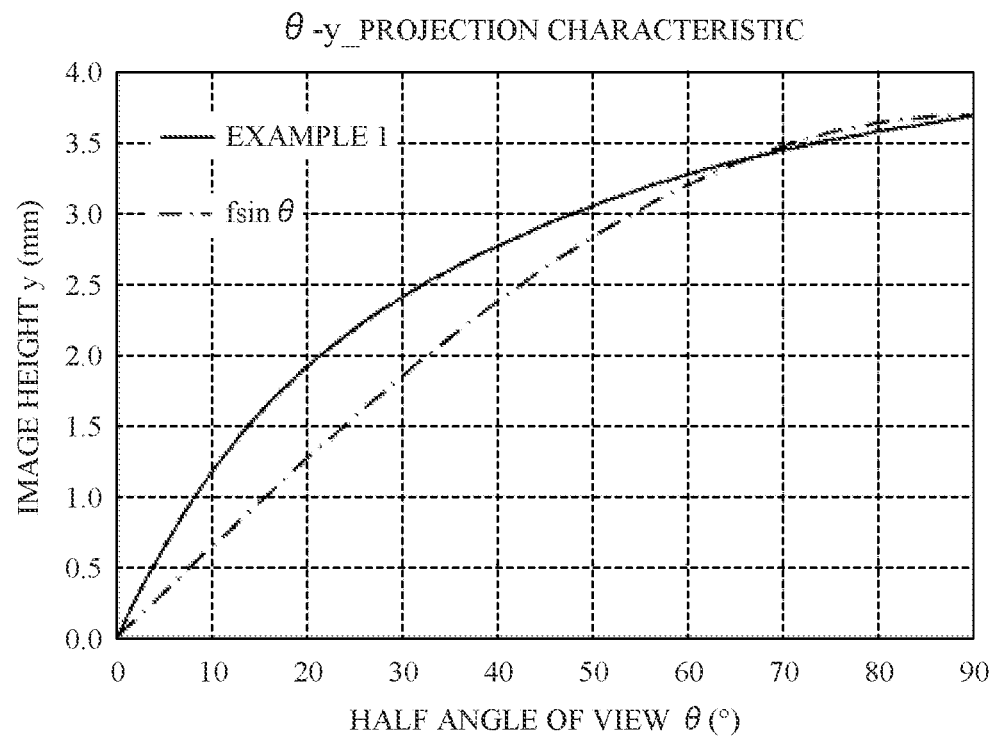
FIG. 3 illustrates a projection characteristic of the optical system according to Example 1.
Figure 4:
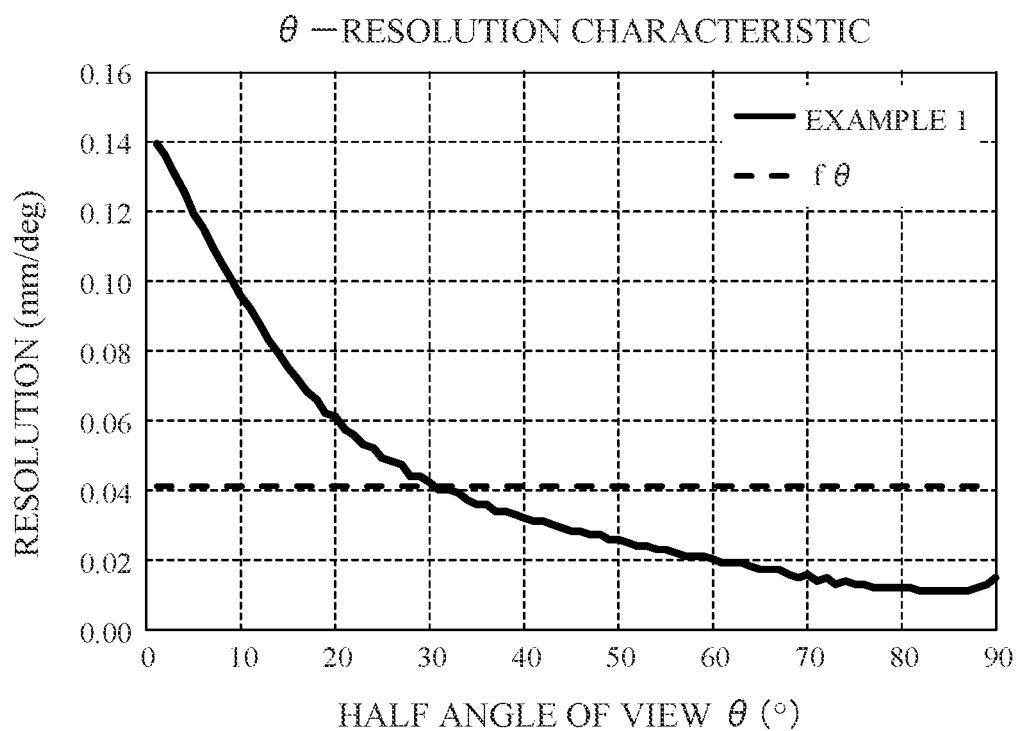
FIG. 4 illustrates a resolution characteristic of the optical system according to Example 1.
Figure 7:
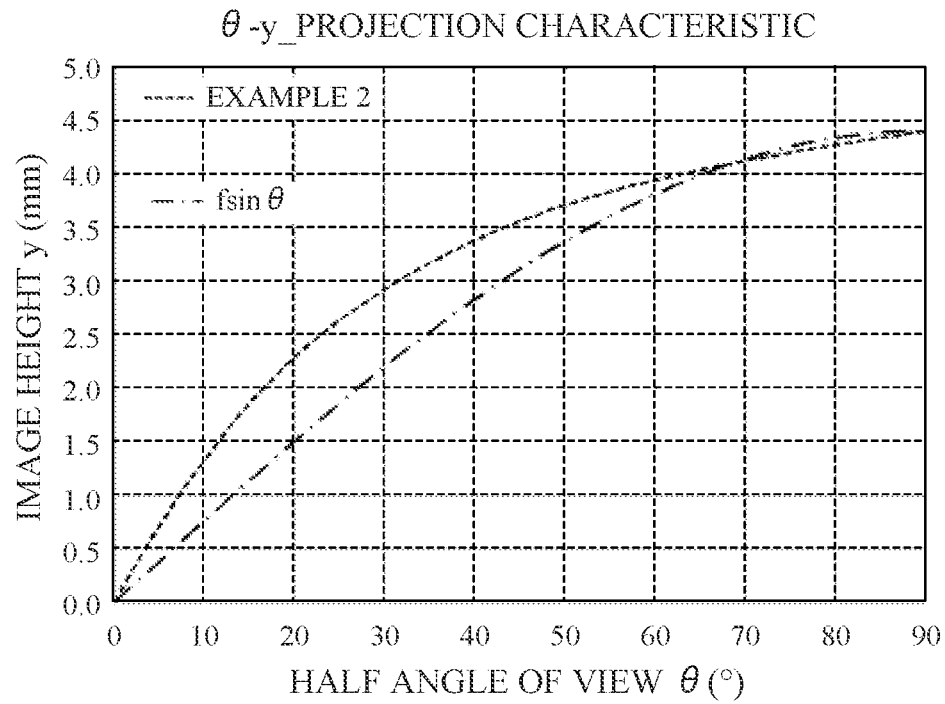
FIG. 7 illustrates a projection characteristic of the optical system according to Example 2.
Figure 8:
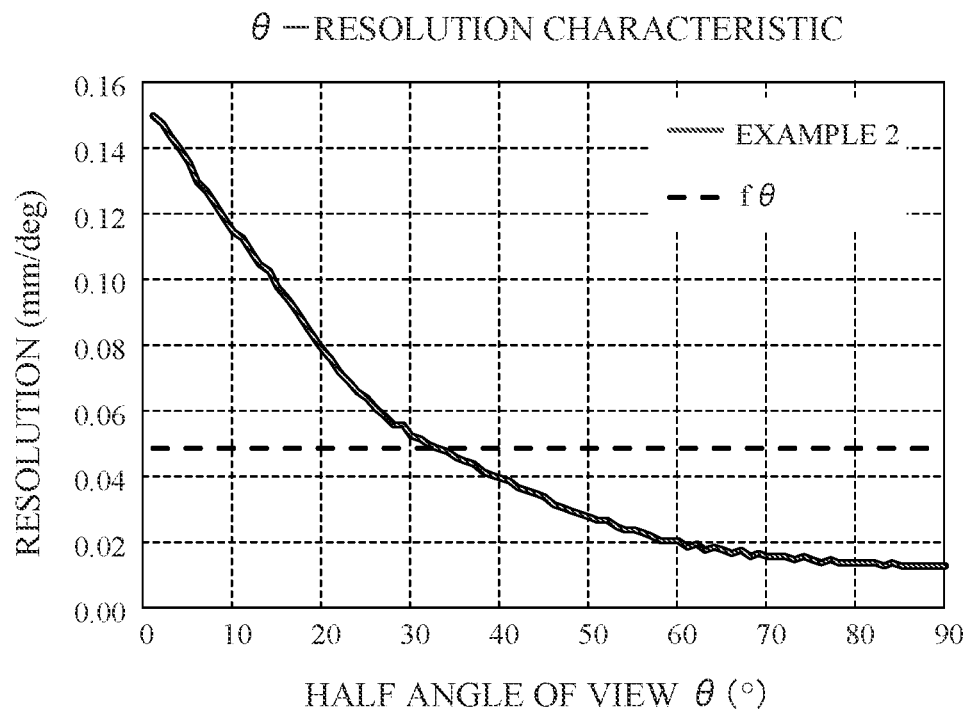
FIG. 8 illustrates a resolution characteristic of the optical system according to Example 2.
Figure 11:
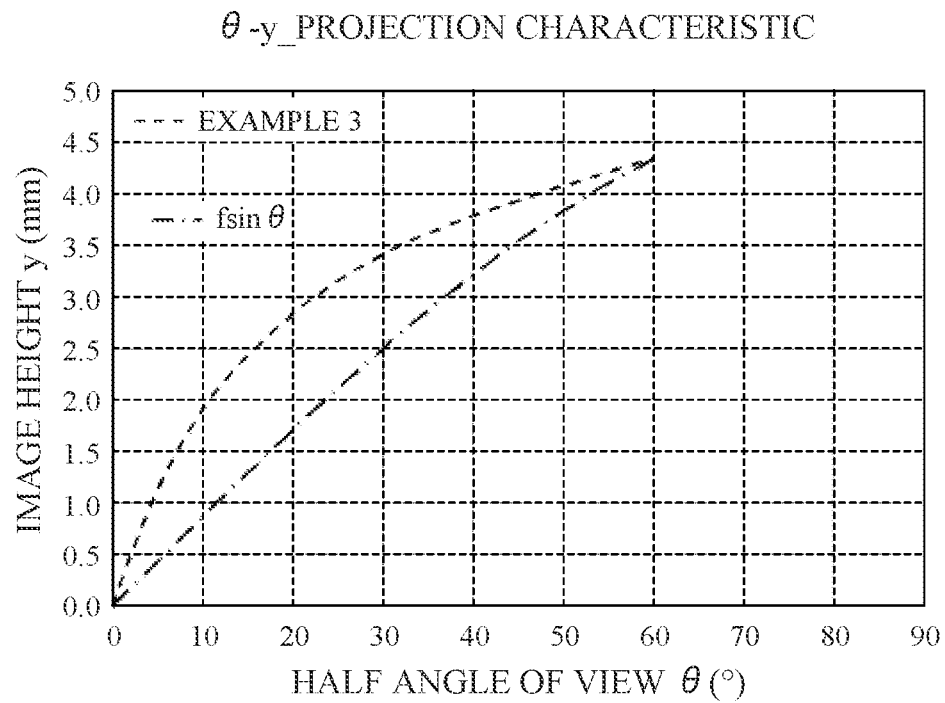
FIG. 11 illustrates a projection characteristic of the optical system according to Example 3.
Figure 12:
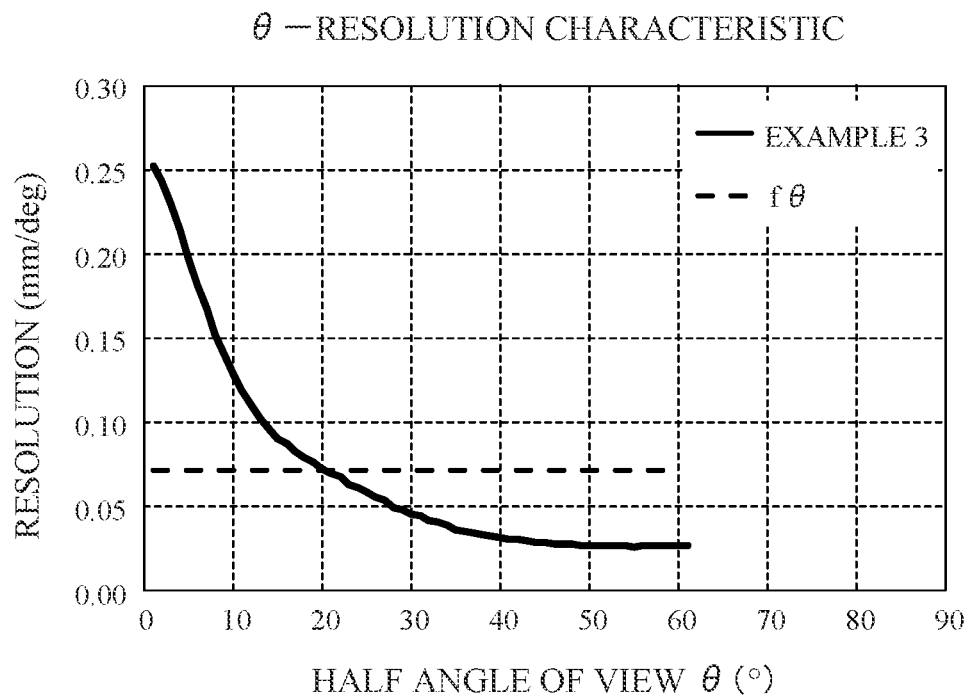
FIG. 12 illustrates a resolution characteristic of the optical system according to Example 3.

FIGS. 3, 7, and 11 illustrate a projection characteristic $y(\theta)$ of the optical system according to each of Examples 1, 2, and 3, respectively (as "θ-y_PROJECTION CHARACTERISTIC"). The projection characteristic according to each example has a sufficient angle of view of 90° as in the orthogonal projection method defined by y=f sin θ, while the image height in the first area is higher than that in the orthogonal projection method. FIGS. 4, 8, and 12 illustrate a resolution characteristic representing the resolution of the optical system according to each of Examples 1, 2, and 3 for each angle of view θ, respectively. The resolution characteristic according to each example has a higher resolution in the first area and a lower resolution in the second area than the equidistant projection method defined by y=fθ.

In each example, in order to realize such a projection characteristic and such a resolution characteristic, as described above, the front unit on the enlargement conjugate side of the diaphragm includes three or more lenses, and the lens closest to the enlargement conjugate position in the front unit (optical system) has a positive refractive power. A lens second L2, L22, or L32 counted from the enlargement conjugate position has a negative refractive power, and a telephoto type lens configuration is implemented. In addition, a focal length of the entire optical system is set long. Thereby, the resolution in the first area is increased by giving a telephoto effect to a compact configuration.

More specifically, the optical system according to each example satisfies the following inequality (conditional expression) (1):

$$1.80 \leq f \sin \theta max / y(\theta max) \leq 4.50 \tag{1}$$

where $y(\theta)$ is a projection characteristic that represents a relationship between an angle of view θ and an image height y on an image plane, f is a focal length (mm) of the optical system, and θmax is a maximum half angle of view (°) of the optical system.

If f sin θmax/y(θmax) is lower than the lower limit in the inequality (1), the telephoto effect becomes too weak to obtain the sufficient resolution in the first area. If f sin θmax/y(θmax) is higher than the upper limit in the inequality (1), the telephoto effect becomes too strong to realize a good resolution performance.

In order to obtain a better optical performance, the following inequality (1)' may be satisfied:

$$1.85 \leq f \sin \theta max / y(\theta max) \leq 3.50 \tag{1)'}$$

In order to obtain a better optical performance, the following inequality (1)" may be satisfied:

$$1.90 \leq f \sin \theta max / y(\theta max) \leq 3.00 \tag{1)''}$$

Satisfying the above condition can provide an optical system having a sufficient angle of view, sufficient peripheral and central resolutions, and a good optical performance over the entire angle of view, although it is a single optical system.

The optical system according to each example has a telephoto type lens configuration, as described above, in which the focal length f1 of the lens L1 closest to the enlargement conjugate position is positive and the focal length f2 of the second lens L2 counted from the enlargement conjugate side is negative in the front unit. These focal lengths may satisfy the following inequality (2):

$$0.1 \leq |f2/f1| \leq 1.5 \tag{2}$$

If |f2/f1| is lower than the lower limit in the inequality (2), the positive refractive power becomes relatively weaker and it becomes difficult to achieve the telephoto effect. If |f2/f1| is higher than the upper limit in the inequality (2), the positive refractive power becomes relatively strong, the curvature of field becomes in a significant undercorrection state, and a good image quality cannot be obtained.

In order to obtain a more sufficient telephoto performance, the following inequality (2)' may be satisfied:

$$0.2 \leq |f2/f1| \leq 1.4 \tag{2)'}$$

In order to obtain a more sufficient telephoto performance, the following inequality (2)" may be satisfied.

$$0.3 \leq |f2/f1| \leq 1.3 \tag{2)''}$$

Where θb is a half angle of view when a resolution of the equidistant projection fθ is equal to y(θmax)/θmax, satisfying the following inequality (3) can realize the above projection characteristic and better optical performance:

$$0.20 \leq \theta b / \theta max \leq 0.45 \tag{3}$$

The inequality (3) indicates a condition relating to the angle of view θ (half angle of view θb) at which the resolution of the optical system according to each example intersects the resolution of the equidistant projection method fθ. As illustrated in FIGS. 4, 8, and 12, in the optical system according to each example, a curve (solid line) showing the projection characteristic intersects a straight line (broken line) of fθ in a range of a half angle of view θb of 20° to 35° against the maximum half angle of view θmax=90°. At an angle of view of θb or less (first area), a higher resolution than that of fθ can be obtained, and a peripheral resolution near θmax=90°, although it is lower than that of fθ, can be sufficiently secured.

If θb/θmax is lower than the lower limit in the inequality (3), the angle of view of the intersection in each figure becomes smaller, the telephoto effect becomes too strong to realize a good resolution performance. If θb/θmax is higher than the upper limit in the inequality (3), the telephoto effect becomes too weak to realize a sufficient resolution in the first area.

In order to obtain a better optical performance, the following inequality (3)' may be satisfied.

$$0.25 \leq \theta b/\theta max \leq 0.42 \tag{3)'}$$

In order to obtain a better optical performance, the following inequality (3)" may be satisfied:

$$0.30 \leq \theta b/\theta max \leq 0.38 \tag{3)"}$$

The optical system according to each example has a lens configuration that satisfactorily corrects the distortion and the curvature of field in order to obtain a good optical characteristic while realizing the above projection characteristic. More specifically, an aspherical surface that is set to at least one of surfaces on the enlargement conjugate side and the reduction conjugate side of the lenses L1, L2, L7, L21, L27, L31, and L37, each of which receives an incident off-axis ray at a high position effectively corrects the distortion and the curvature of field. The projection characteristic is mainly realized by the lens on the enlargement conjugate side, and the curvature of field is corrected by the subsequent lenses.

Figure 13A:
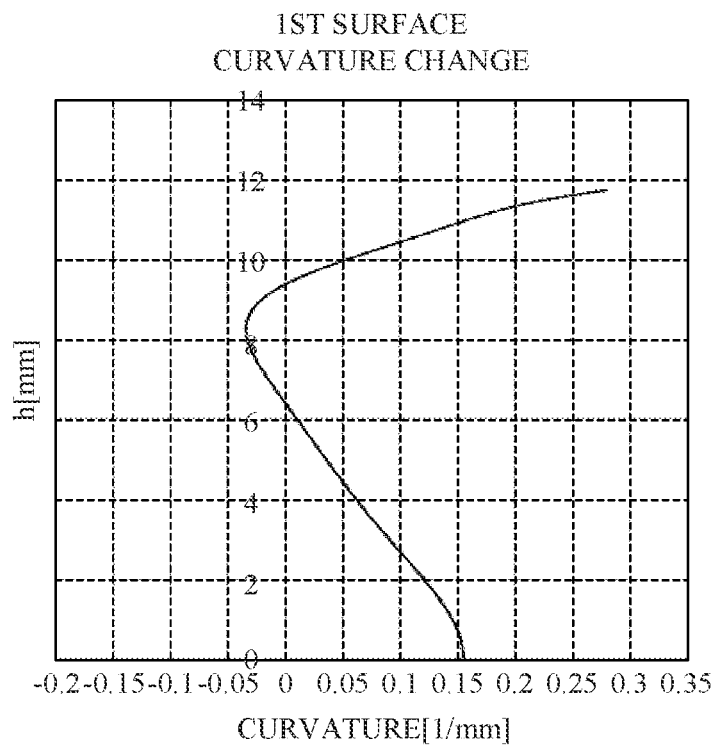
FIGS. 13A to 13D illustrate a curvature characteristic of the optical system according to Example 1.
Figure 13B:
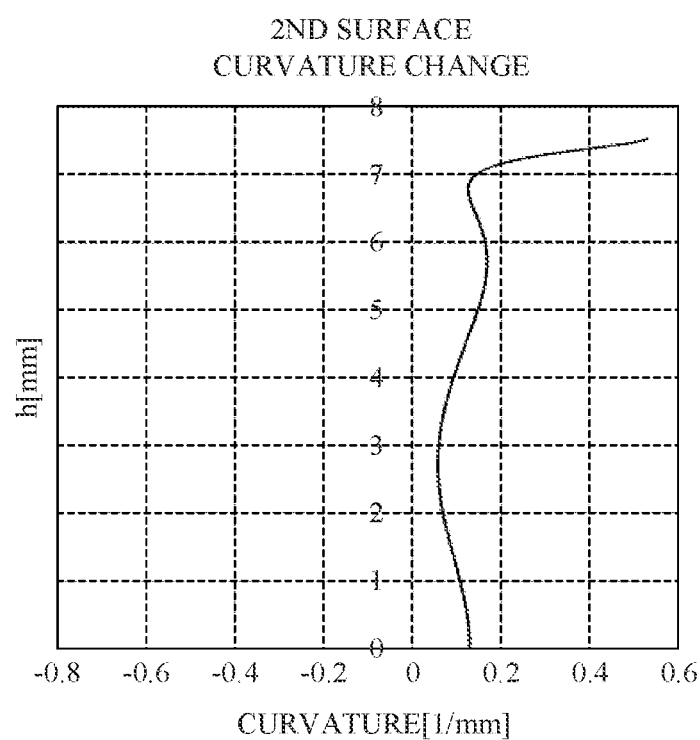
Figure 13C:
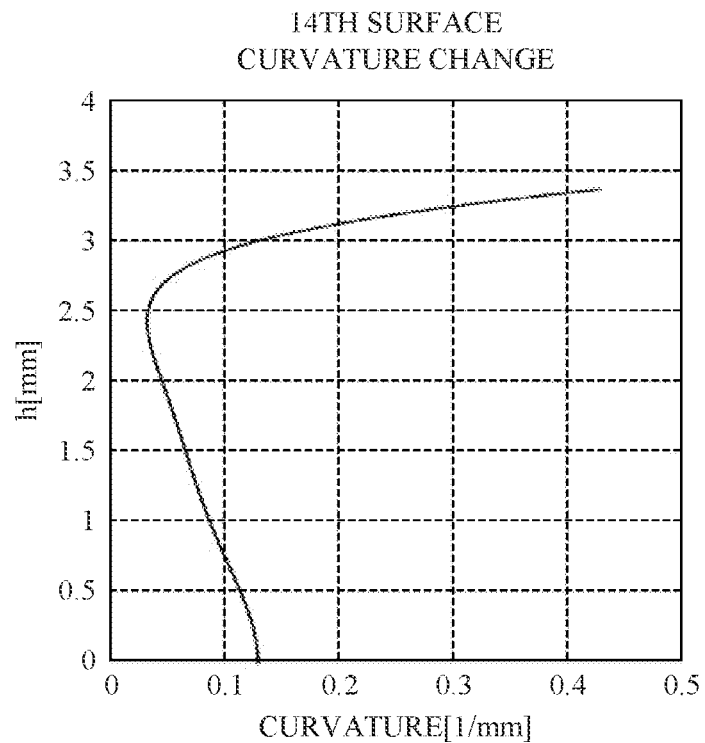
Figure 13D:
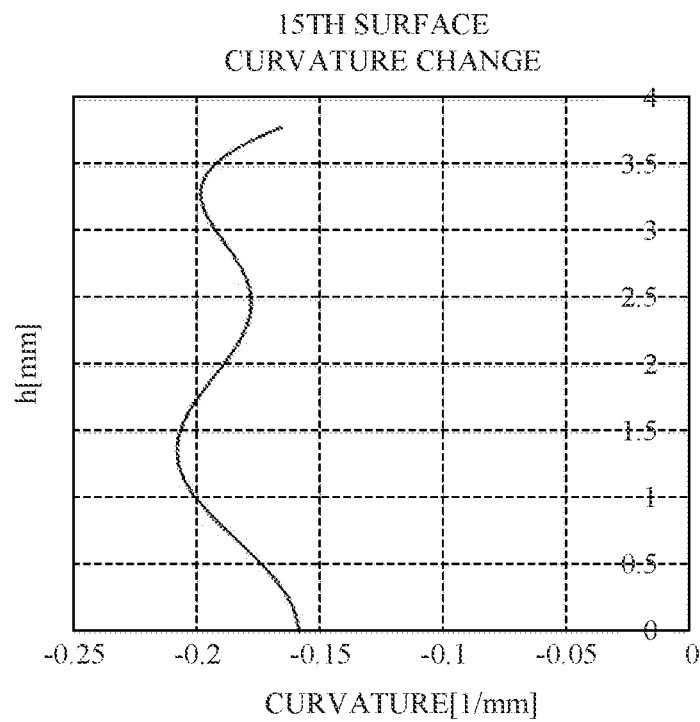

In the optical system according to each example, the aspherical surface has a shape with an inflection point in order to realize the above projection characteristic. The inflection point is a point (a circle centered on the optical axis) at which a sign of the curvature C is switched. FIGS. 13A to 13D illustrate a curvature (y-C) characteristic representing a relationship between a radial height y from the optical axis (vertical axis) and a curvature C (horizontal axis) of each aspherical surface in the optical system according to Example 1. FIG. 13A illustrates a y-C characteristic of a first surface on the enlargement conjugate side of the lens L1. FIG. 13B illustrates a y-C characteristic of a second surface on the reduction conjugate side of the lens L1. FIG. 13C illustrates a v-C characteristic of a fourteenth surface on the enlargement conjugate side of the lens L7. FIG. 13D illustrates a y-C characteristic of a fifteenth surface on the reduction conjugate side of the lens L7.

As understood from FIG. 13A, the aspherical surface on the enlargement conjugate side of the lens L1 in the optical system according to Example 1 has an inflection point. Thus providing the inflection point to the aspherical surface on the enlargement conjugate side of the lens L1 can significantly change the resolution between the first area and the second area, and realize the above projection characteristic.

In order to achieve both the wide angle of view and the above projection characteristic, an arbitrary aspherical surface on the enlargement conjugate side may have a shape with a plurality of inflection points on the same surface. As the image height y changes from the vicinity of the optical axis (or optical axis) to the off-axis side (outside in the radial direction), the curvature C of the aspherical surface on the enlargement conjugate side of the lens L1 illustrated in FIG. 13A changes from positive to negative at the inflection point near 6.3 mm, and then to positive at the inflection point near 9.5 mm on the off-axis side. That is, the aspherical surface on the enlargement conjugate side of the lens L1 has two inflection points. This aspherical shape is formed for the following reasons. First, near the optical axis, the aspherical shape is made to have a convex shape facing the enlargement conjugate side in order to provide the telephoto effect, and then the aspherical shape is changed to have a concave shape facing the enlargement conjugate side in order to gradually reduce the resolution toward the off-axis side. In order to secure the resolution near the periphery, the aspherical shape is again changed to have a convex shape facing the enlargement conjugate side. The aspherical surface of the lens L1 thus has, in order from an optical axis side (or the optical axis) to a periphery side (or to the outside in the radial direction), a convex shape facing the enlargement conjugate side, a concave shape facing the enlargement conjugate side, and a convex shape facing the enlargement conjugate side.

As illustrated in FIG. 13C, the lens L7 that receives an incident off-axis principal ray at a high position, which is disposed closest to the reduction conjugate position in the rear unit in Example 1 effectively corrects the curvature of field. The lens L7 may have an aspherical surface on at least one of the enlargement conjugate side and the reduction conjugate side. The aspherical surface of the lens L7 may have an inflection point.

Since the above projection characteristic becomes more effective as the angle of view becomes wider, the following inequality (4) may be satisfied:

$$\theta max \geq 50° \tag{4}$$

This numerical range may be set as follows:

$$\theta max \geq 55° \tag{4)'}$$

This numerical range may be set as follows:

$$\theta max \geq 60° \tag{4)"}$$

In order to realize the above projection characteristic, wide angle of view, and high image quality, the following lens configuration (refractive power arrangement) may be used. That is, the front unit includes, in order from the enlargement conjugate side to the reduction conjugate side, a first lens (positive lens) having a positive refractive power, a and a second lens (negative lens) having a negative refractive power, a third lens (positive or negative lens) having a positive or negative refractive power, and a fourth lens (positive lens) having a positive refractive power. The rear unit includes, in order from the enlargement conjugate side to the reduction conjugate side, a fifth lens (positive lens) having a positive refractive power, a sixth lens (negative lens) having a negative refractive power, and a seventh lens (positive lens) having a positive refractive power.

The above description is a minimum necessary configuration for an example of the present invention, and the configuration of the example is not limited to this description. For example, the position of the diaphragm may be a position near a position where the off-axis principal ray intersects the optical axis, and is not limited to the position of the physical diaphragm. The projection characteristic, the position and number of inflection points, and the like are not limited to the above examples.

Optical systems according to Examples 1 to 3 will be specifically described.

Example 1

The optical system according to Example 1 illustrated in FIG. 1 includes, in order from the enlargement conjugate side to the reduction conjugate side, a front unit that includes a first lens L1 having a positive refractive power, a second lens L2 having a negative refractive power, a third lens L3 having a negative refractive power, and a fourth lens L4 having a positive refractive power; a diaphragm ST1; and a rear unit that includes a fifth lens L5 having a positive refractive power, a sixth lens L6 having a negative refractive power, and a seventh lens L7 having a positive refractive power. In FIG. 1, P1 and P2 are glass plates such as filters.

Table 1 illustrates specific numerical examples of this example. In the numerical example, ri denotes a radius of curvature (mm) of an i-th surface counted from the object side, di denotes a lens thickness or air spacing (mm) between an i-th surface and an (i+1)-th surface, and ni denotes a refractive index for the d-line of an optical material between an i-th surface and an (i+1)-th surface. vi denotes an Abbe number based on the d-line of the optical material between an i-th surface and an (i+1)-th surface.

The Abbe number v is expressed as follows:

$$v=(Nd-1)/(NF-NC)$$

where Nd, NF, and NC are refractive indexes for the d-line (587.6 nm), the F-line (486.1 nm), and the C-line (656.3 nm) in the Fraunhofer lines.

ST denotes a position of the diaphragm. An asterisk * attached to the surface number means that the surface is aspherical. The aspheric shape is expressed by the following expression:

$$z(y)(y^2/Ri)/[1+\{1-(1+k)(y^2/Ri^2)\}^{1/2}]+Ay^4+By^6+Cy^8+Dy^{10}+Ey^{12}+Fy^{14}$$

where y is a coordinate in the radial direction, z is a coordinate in the optical axis direction, K is a conical constant, a light traveling direction is set positive, and R is a paraxial radius of curvature, and A, B, C, D, E, and F are aspherical coefficients.

Table 1(C) summarizes values corresponding to the inequalities (1) to (4) in the numerical example. A value of y(θmax) is also shown as a reference value. The above description of the numerical examples is similarly applied to the numerical examples of the other examples.

As illustrated in Table 1(C), the optical system according to this example (numerical example 1) satisfies the inequalities (1) to (4).

Figure 2:
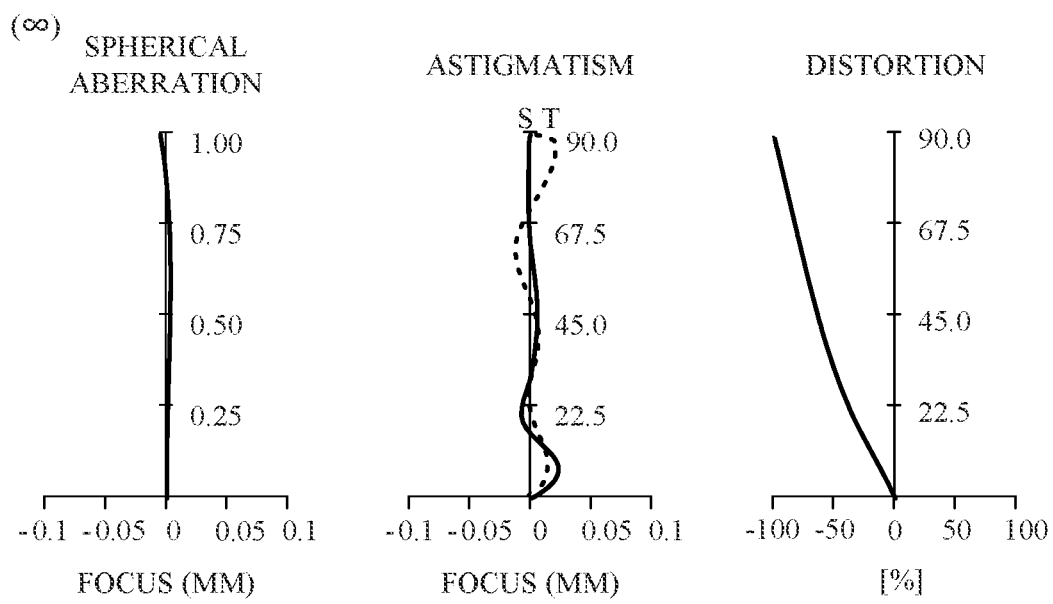
FIG. 2 is an aberration diagram of the optical system according to Example 1.

FIG. 2 illustrates a longitudinal aberration diagram of this example (numerical example 1) at an imaging distance of ∞. In the spherical aberration diagram, a solid line denotes the spherical aberration for the d-line (wavelength 587.6 nm). In the astigmatism diagram, a solid line S denotes a sagittal image plane, and a broken line T denotes a meridional image plane. The distortion diagram is illustrated for the d-line. The description of these longitudinal aberration diagrams is similarly applied to those of the other examples.

As described above, FIG. 3 illustrates the projection characteristic of the optical system according to this example, and FIG. 4 illustrates the resolution characteristic of the optical system according to this example.

Example 2

The optical system according to Example 2 illustrated in FIG. 5 is different from that of Example 1 in the projection characteristic and the refractive power arrangement. The optical system according to this example includes, in order from the enlargement conjugate side to the reduction conjugate side, a front unit that includes a first lens L21 having a positive refractive power, a second lens L22 having a negative refractive power, a third lens L23 having a positive refractive power, and a fourth lens L24 having a positive refractive power; a diaphragm ST2; and a rear unit that includes a fifth lens L25 having a positive refractive power, a sixth lens L26 having a negative refractive power, and a seventh lens L27 having a positive refractive power. The third lens L23, which is the third lens counted from the enlargement conjugate side, has a positive refractive power unlike Example 1. In FIG. 5, P21 is a glass plate such as a filter.

Table 2 illustrates specific numerical examples of this example. As illustrated in Table 2(C), the optical system according to this example (numerical example 2) satisfies the inequalities (1) to (4).

Figure 6:
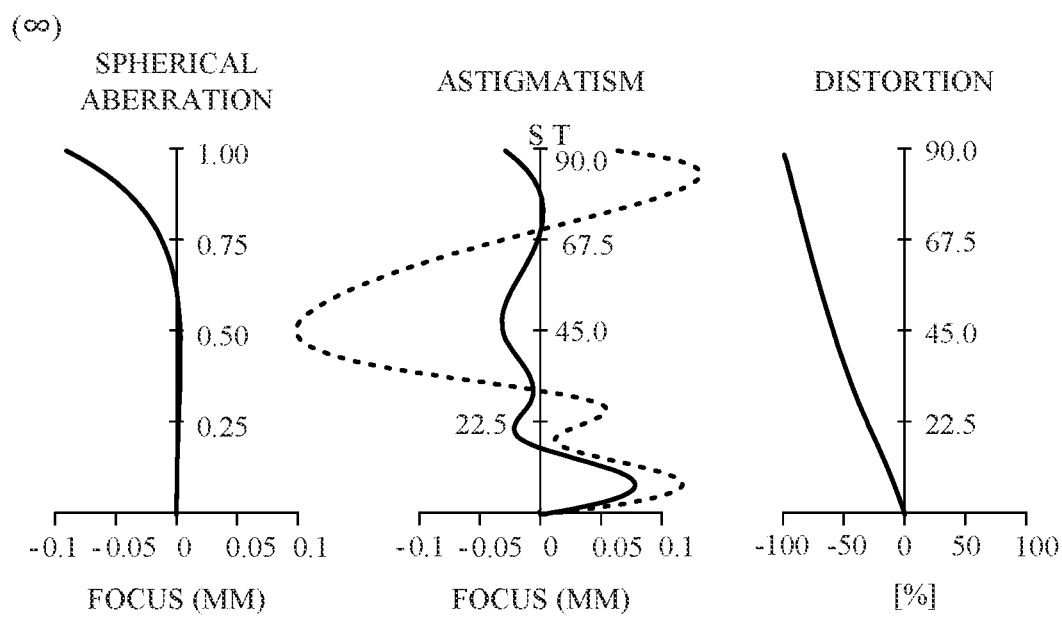
FIG. 6 is an aberration diagram of the optical system according to Example 2.

FIG. 6 illustrates a longitudinal aberration diagram of this example (numerical example 2) at an imaging distance of ∞. As described above, FIG. 7 illustrates the projection characteristic of the optical system according to this example, and FIG. 8 illustrates the resolution characteristic of the optical system according to this example.

Example 3

The optical system according to Example 3 illustrated in FIG. 9 is different from that of Example 1 in the projection characteristic and the angle of view. The optical system according to this example includes, in order from the enlargement conjugate side to the reduction conjugate side, a front unit that includes a first lens L31 having a positive refractive power, a second lens L32 having a negative refractive power, a third lens L33 having a negative refractive power, and a fourth lens L34 having a positive refractive power; a diaphragm ST3; and a rear unit that includes a fifth lens L35 having a positive refractive power, a sixth lens L36 having a negative refractive power, and a seventh lens L37 having a positive refractive power. In FIG. 9, P31 is a glass plate such as a filter.

Table 3 illustrates specific numerical examples of this example. As illustrated in Table 3(C), the optical system according to this example (numerical example 3) satisfies the inequalities (1) to (4).

Figure 10:
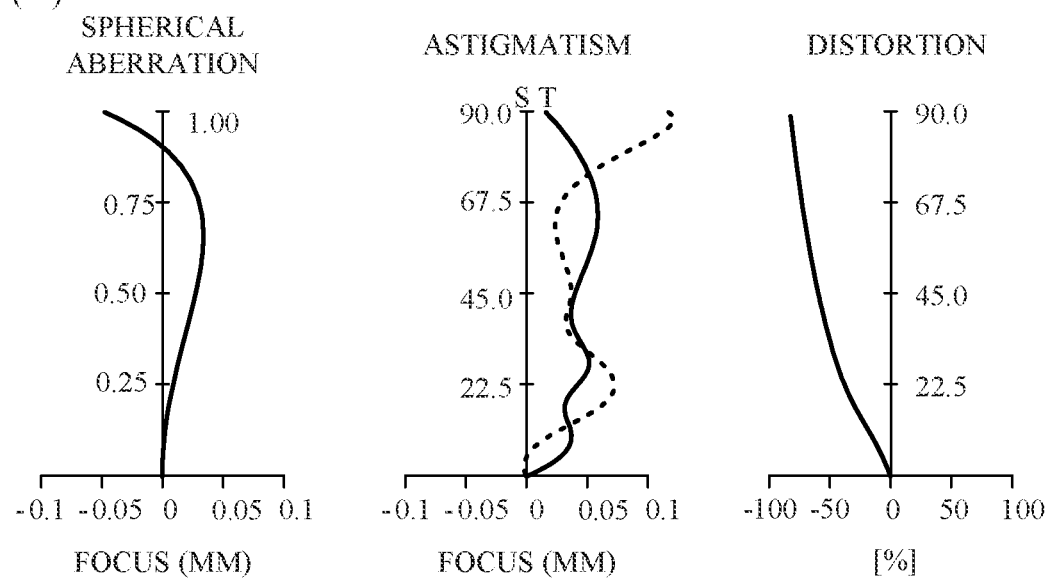
FIG. 10 is an aberration diagram of the optical system according to Example 3.

FIG. 10 illustrates a longitudinal aberration diagram of this example (numerical example 3) at an imaging distance of ∞. As described above, FIG. 11 illustrates the projection characteristic of the optical system according to this example, and FIG. 12 illustrates the resolution characteristic of the optical system according to this example.

TABLE 1

(NUMERICAL EXAMPLE 1)
(A) LENS CONFIGURATION (UNIT: mm)

| | | | | | | | | | |
|---|---|---|---|---|---|---|---|---|---|
| | f (FOCAL LENGTH) | | | | | | 8.00 | | |
| | F (APERTURE RATIO) | | | | | | 3.00 | | |
| | MAXIMUM HALF ANGLE OF VIEW | | | | | | 90.0° | | |
| * | r1 = | 6.44 | d1 = | 3.74 | n1 = | 1.661 | v1 = | 57.0 |
| * | r2 = | 7.77 | d2 = | 1.27 | | | | |
| * | r3 = | 11.42 | d3 = | 2.94 | n2 = | 1.861 | v2 = | 26.8 |
| * | r4 = | 5.11 | d4 = | 1.29 | | | | |

TABLE 1-continued (NUMERICAL EXAMPLE 1)
(A) LENS CONFIGURATION (UNIT: mm)

|   |   |       |      |       |      |      |       |      |       |
|---|---|-------|------|-------|------|------|-------|------|-------|
|   | r5 = | 10.17 | d5 = | 2.89 | n3 = | 1.841 | ν3 = | 44.3 |
|   | r6 = | 3.93 | d6 = | 2.89 | | | | |
|   | r7 = | 6.69 | d7 = | 1.05 | n4 = | 1.535 | ν4 = | 49.7 |
|   | r8 = | −6.62 | d8 = | 0.62 | | | | |
| ST | r9 = | ∞ | d9 = | 1.23 | | | | |
|   | r10 = | 5.80 | d10 = | 1.14 | n5 = | 1.631 | ν5 = | 58.5 |
|   | r11 = | −5.73 | d11 = | 0.10 | | | | |
|   | r12 = | −4.74 | d12 = | 0.25 | n6 = | 1.859 | ν6 = | 28.8 |
|   | r13 = | 9.79 | d13 = | 0.11 | | | | |
| * | r14 = | 7.71 | d14 = | 1.58 | n7 = | 1.657 | ν7 = | 57.2 |
| * | r15 = | −6.30 | d15 = | 1.21 | | | | |
|   | r16 = | ∞ | d16 = | 0.65 | n8 = | 1.560 | ν8 = | 56.0 |
|   | r17 = | ∞ | d17 = | 1.64 | | | | |
|   | r18 = | ∞ | d18 = | 0.30 | n9 = | 1.500 | ν9 = | 63.0 |
|   | r19 = | ∞ | d19 = | 0.10 | | | | |

(B) ASPHERICAL COEFFICIENT

|     | K | A | B | C | D | E | F |
|-----|------|------|------|------|------|------|------|
| r1  | −0.7428199 | −5.19E−04 | 1.66E−06 | −2.49E−08 | 5.58E−11 | 1.22E−12 | −6.48E−15 |
| r2  | 0.01008412 | −2.11E−03 | 7.90E−05 | −1.90E−06 | 2.90E−08 | −2.17E−10 | 0 |
| r3  | 0 | 3.75E−04 | 3.57E−06 | −4.36E−08 | −1.43E−09 | −3.20E−11 | 0 |
| r4  | 0 | 9.22E−04 | −1.11E−04 | 9.53E−08 | 1.25E−07 | 2.22E−10 | 0 |
| r14 | −25.146264 | 1.14E−03 | −3.51E−05 | −1.16E−05 | 9.47E−07 | 0 | 0 |
| r15 | 0 | −5.44E−03 | 7.92E−04 | −6.03E−05 | 2.05E−06 | −2.46E−08 | 0 |

(C) VALUES OF INEQUALITIES

| | |
|---|---|
| (1) | 2.16 |
| (2) | 0.51 |
| (3) | 0.33 |
| (4) | 90 |

REFERENCE VALUE

| | |
|---|---|
| y(θmax) | 3.70 |

TABLE 2

(NUMERICAL EXAMPLE 2)
(A) LENS CONFIGURATION (UNIT: mm)

| | | | | | | |
|---|---|---|---|---|---|---|
| f (FOCAL LENGTH) | | | | 8.60 | | |
| F (APERTURE RATIO) | | | | 2.40 | | |
| MAXIMUM HALF ANGLE OF VIEW | | | | 90.0° | | |

|   |   |       |      |       |      |      |       |      |       |
|---|---|-------|------|-------|------|------|-------|------|-------|
| * | r1 = | 6.39 | d1 = | 2.85 | n1 = | 1.697 | ν1 = | 55.5 |
| * | r2 = | 9.32 | d2 = | 0.50 | | | | |
|   | r3 = | 9.52 | d3 = | 2.00 | n2 = | 1.860 | ν2 = | 36.0 |
|   | r4 = | 3.97 | d4 = | 3.57 | | | | |
|   | r5 = | −16.14 | d5 = | 1.53 | n3 = | 1.850 | ν3 = | 32.0 |
|   | r6 = | −10.06 | d6 = | 1.13 | | | | |
|   | r7 = | −9.59 | d7 = | 2.00 | n4 = | 1.576 | ν4 = | 61.8 |
|   | r8 = | −6.11 | d8 = | 1.50 | | | | |
| ST | r9 = | ∞ | d9 = | 0.50 | | | | |
|   | r10 = | 4.53 | d10 = | 1.69 | n5 = | 1.487 | ν5 = | 70.2 |
|   | r11 = | −4.43 | d11 = | 0.50 | | | | |
|   | r12 = | −3.76 | d12 = | 1.00 | n6 = | 1.850 | ν6 = | 32.0 |
|   | r13 = | 261.47 | d13 = | 0.50 | | | | |
|   | r14 = | 9.24 | d14 = | 2.42 | n7 = | 1.686 | ν7 = | 55.9 |
| * | r15 = | −15.32 | d15 = | 0.96 | | | | |
|   | r16 = | ∞ | d16 = | 1.30 | n8 = | 1.516 | ν8 = | 64.1 |
|   | r17 = | ∞ | d17 = | 1.04 | | | | |

(B) ASPHERICAL COEFFICIENT

|     | K | A | B | C | D | E | F |
|-----|------|------|------|------|------|------|------|
| r1  | −0.8846558 | −2.39E−04 | 2.32E−06 | −6.78E−08 | −1.49E−10 | 2.35E−12 | 2.70E−14 |
| r2  | 0 | −8.85E−04 | 1.41E−06 | 9.46E−07 | −2.83E−08 | 2.68E−10 | 0 |
| r15 | 0 | −3.00E−03 | 3.64E−04 | −2.41E−05 | 1.14E−06 | −1.88E−08 | 0 |

TABLE 2-continued (NUMERICAL EXAMPLE 2)
(A) LENS CONFIGURATION (UNIT: mm)

(C) VALUES OF INEQUALITIES

| | |
|---|---|
| (1) | 1.95 |
| (2) | 0.46 |
| (3) | 0.37 |
| (4) | 90 |

REFERENCE VALUE

| | |
|---|---|
| y(θmax) | 4.41 |

TABLE 3

(NUMERICAL EXAMPLE 3)
(A) LENS CONFIGURATION (UNIT: mm)

| | | | | | | | |
|---|---|---|---|---|---|---|---|
| f (FOCAL LENGTH) | | | | | 14.50 | | |
| F (APERTURE RATIO) | | | | | 2.40 | | |
| MAXIMUM HALF ANGLE OF VIEW | | | | | 60.0° | | |

| | | | | | | | | |
|---|---|---|---|---|---|---|---|---|
| * | r1 = | 14.30 | d1 = | 4.54 | n1 = | 1.861 | v1 = | 37.1 |
| * | r2 = | 29.93 | d2 = | 2.11 | | | | |
| | r3 = | −78.81 | d3 = | 1.05 | n2 = | 1.963 | v2 = | 24.1 |
| | r4 = | 41.30 | d4 = | 2.25 | | | | |
| | r5 = | −54.67 | d5 = | 0.88 | n3 = | 1.963 | v3 = | 24.1 |
| | r6 = | 56.88 | d6 = | 3.51 | | | | |
| | r7 = | −99.86 | d7 = | 3.23 | n4 = | 1.923 | v4 = | 27.3 |
| | r8 = | −17.38 | d8 = | 10.33 | | | | |
| ST | r9 = | ∞ | d9 = | 0.84 | | | | |
| | r10 = | 8.26 | d10 = | 2.011795757 | n5 = | 1.628 | v5 = | 53.5 |
| | r11 = | −6.64 | d11 = | 0.64 | | | | |
| | r12 = | −5.36 | d12 = | 0.31 | n6 = | 1.946 | v6 = | 24.2 |
| | r13 = | −48.45 | d13 = | 1.56 | | | | |
| * | r14 = | 9.80 | d14 = | 4.48 | n7 = | 1.583 | v7 = | 59.4 |
| * | r15 = | −1000.00 | d15 = | 0.96 | | | | |
| | r16 = | ∞ | d16 = | 1.30 | n8 = | 1.516 | v8 = | 64.1 |
| | r17 = | ∞ | d17 = | 1.00 | | | | |

(B) ASPHERICAL COEFFICIENT

| | K | A | B | C | D | E |
|---|---|---|---|---|---|---|
| r1 | −0.4951006 | −2.28E−04 | 2.47E−06 | −2.16E−08 | 6.87E−11 | −5.44E−14 |
| r2 | 3.304494 | −4.53E−04 | 1.05E−05 | −1.46E−07 | 1.04E−09 | −2.86E−12 |
| r14 | 0 | −2.05E−03 | 2.68E−04 | −2.65E−05 | 1.20E−06 | −2.04E−08 |
| r15 | 0 | −1.18E−02 | 9.86E−04 | −4.88E−05 | 1.25E−06 | −1.23E−08 |

(C) VALUES OF INEQUALITIES

| | |
|---|---|
| (1) | 2.89 |
| (2) | 1.00 |
| (3) | 0.32 |
| (4) | 60 |

REFERENCE VALUE

| | |
|---|---|
| y(θmax) | 4.34 |

Figure 14:
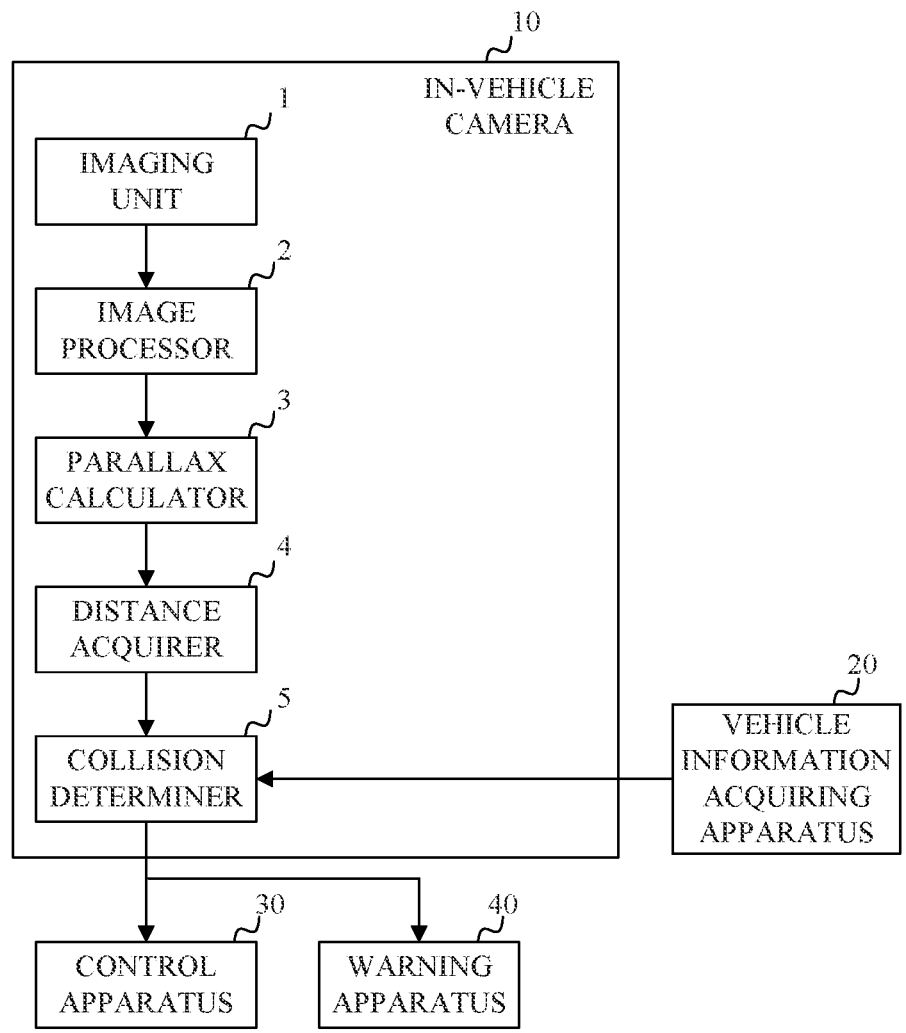
FIG. 14 is a block diagram of an in-vehicle system using the optical system according to each example.

FIG. 14 illustrates a configuration of an in-vehicle camera 10 using the optical system according to any one of the above examples for an imaging optical system, and an in-vehicle system (driving support device) 600 having the same. The in-vehicle system 600 is a system held by a moving body (moving apparatus) that is movable such as an automobile (vehicle), and configured to support driving (steering) of the vehicle based on image information around the vehicle acquired by the in-vehicle camera 10.

Figure 15:
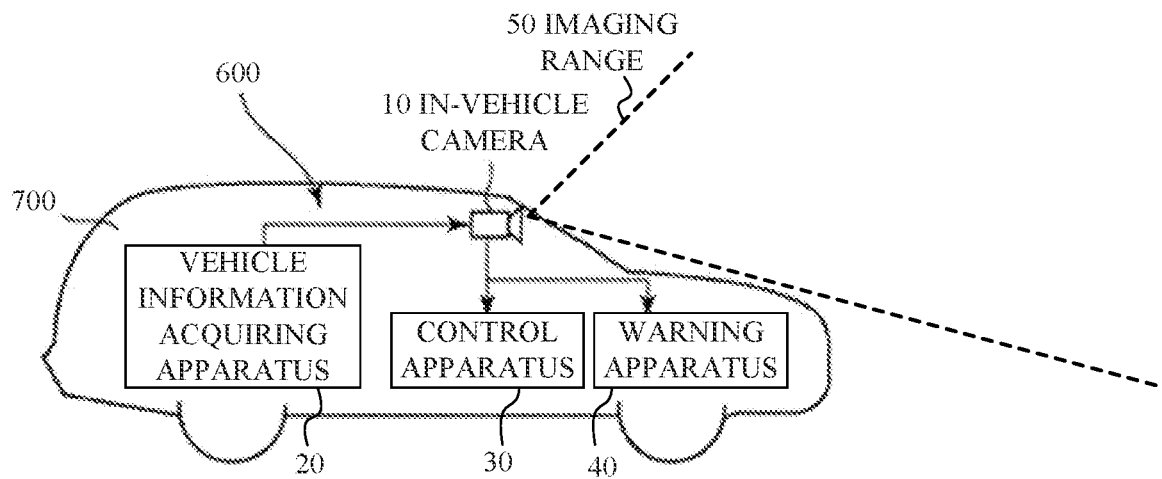
FIG. 15 is a schematic view of principal part of a vehicle including the in-vehicle system.

FIG. 15 illustrates a vehicle 700 as a moving apparatus that includes the in-vehicle system 600. While FIG. 15 illustrates an imaging range 50 of the in-vehicle camera 10 set to the front of the vehicle 700, the imaging range 50 may be set to the rear or side of the vehicle 700.

As illustrated in FIG. 15, the in-vehicle system 600 includes the in-vehicle camera 10, a vehicle information acquiring apparatus 20, a control apparatus (controller, ECU: electronic control unit) 30, and a warning apparatus (warning unit) 40. The in-vehicle camera 10 includes an imaging unit 1, an image processor 2, a parallax calculator 3, a distance acquirer 4, and a collision determiner 5. The image processor 2, the parallax calculator 3, the distance acquirer 4, and the collision determiner 5 constitute a processing unit. The imaging unit 1 includes the optical system according to any one of the above examples and an image sensor.

Figure 16:
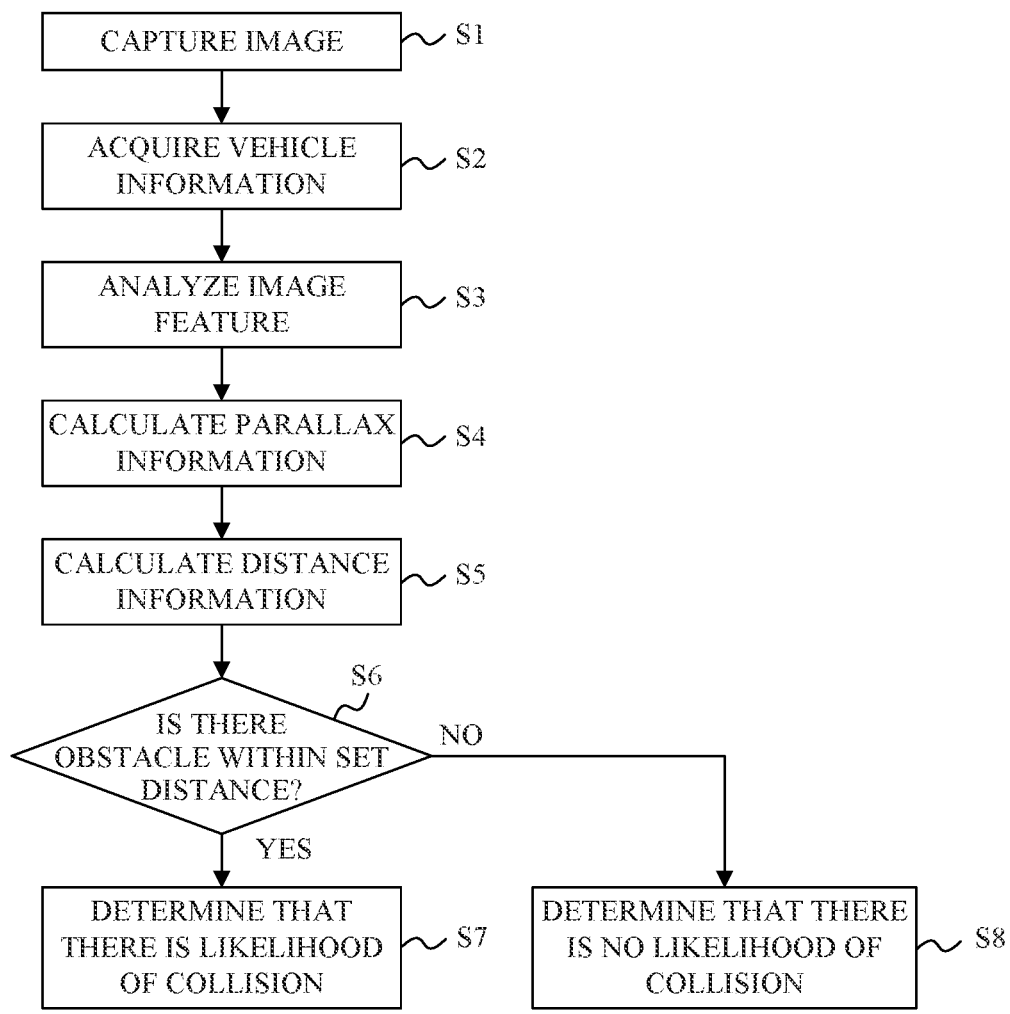
FIG. 16 is a flowchart showing an operation example of the in-vehicle system.

A flowchart of FIG. 16 illustrates an operation example of the in-vehicle system 600. In the step S1, the in-vehicle system 600 images, using the imaging unit 1, an object such as an obstacle or a pedestrian around the vehicle, and acquires a plurality of image data (parallax image data).

In the step S2, vehicle information is acquired by the vehicle information acquiring apparatus 20. The vehicle information is information including a vehicle speed, a yaw rate, a steering angle, and the like of the vehicle.

In the step S3, the image processor 2 performs image processing for the plurality of image data acquired by the imaging unit 1. More specifically, the image feature analysis is performed to analyze a feature amount such as an edge amount, an edge direction, and a density value in image data. The image feature analysis may be performed for each of the plurality of image data, or may be performed only for part of the plurality of image data.

In the step S4, the parallax calculator 3 calculates the parallax (image shift) information between the plurality of image data acquired by the imaging unit 1. A method for calculating the parallax information can use a known method such as the SSDA method or the area correlation method, and a description thereof will be omitted. The steps S2, S3, and S4 may be performed in this order, or may be processed in parallel.

In the step S5, the distance acquirer 4 acquires (calculates) the distance information with the object imaged by the imaging unit 1. The distance information can be calculated based on the parallax information calculated by the parallax calculator 3 and the internal parameters and external parameters of the imaging unit 1. The distance information is information on a relative position with the object such as a distance from the object, a defocus amount, an image shift amount, etc., and may directly represent the distance value of the object in the image or indirectly represent information corresponding to the distance value.

Then, in the step S6, the collision determiner 5 determines whether or not the distance to the object is included in the preset distance range using the vehicle information acquired by the vehicle information acquiring apparatus 20 or the distance information calculated by the distance acquirer 4. This configuration can determine whether or not the object exists within the set distance around the vehicle, and determine a likelihood of collision between the vehicle and the object. The collision determiner 5 determines that "there is a likelihood of collision" (step 7) when the object exists within the set distance, and determines that there is no likelihood of collision (step 8) when the object does not exist within the set distance.

Next, when the collision determiner 5 determines that "there is a likelihood of a collision," the collision determiner 5 notifies (transmits) the determination result to the control apparatus 30 and the warning apparatus 40. At this time, the control apparatus 30 controls the vehicle based on the determination result of the collision determiner 5 (step S6), and the warning apparatus 40 provides a warning to the vehicle user (driver, passenger) (step 7) based on the determination result of the collision determiner 5. The notification of the determination result may be made to at least one of the control apparatus 30 and the warning apparatus 40.

The control apparatus 30 can control the moving of the vehicle by outputting a control signal to a driving unit (engine, motor, etc.) in the vehicle. For example, the control apparatus 30 generates a control signal for hitting the brakes, returning the gas pedal, turning the steering wheel, and applying the braking force to each wheel in the vehicle, and makes control over the vehicle to suppress an output of the engine or the motor. The warning apparatus 40 gives a warning to the user, for example, by issuing a warning sound (alert), displaying warning information on a screen of a car navigation system, or giving vibrations to the seat belt or steering wheel.

According to the in-vehicle system 600 described above, the above processing can effectively detect the object and avoid a collision between the vehicle and the object. In particular, by applying the optical system according to any one of the above examples to the in-vehicle system 600, the entire in-vehicle camera 10 can be made smaller with an improved freedom degree of the arrangement, detect the object, and determine the likelihood of collision at a wide angle of view.

Various methods can be used to calculate the distance information. As an example, a pupil dividing type image sensor that includes a plurality of pixel units regularly arranged in a two-dimensional array is used for the image sensor in the imaging unit 1. In the pupil dividing type image sensor, one pixel unit includes a microlens and a plurality of photoelectric conversion units, receives a pair of light beams that have passed through different areas in the pupil of the optical system, and outputs a pair of image data from each photoelectric conversion unit.

An image shift amount of each area is calculated by the correlation calculation between the pair of image data, and the image shift map data representing a distribution of the image shift amount is calculated by the distance acquirer 4. Alternatively, the distance acquirer 4 may further convert the image shift amount into a defocus amount and generate defocus map data representing a distribution of the defocus amount (distribution on the two-dimensional plane of the captured image). The distance acquirer 4 may acquire the distance map data of the distance to the object converted from the defocus amount.

Each of the in-vehicle system 600 and the mobile apparatus 700 may include a notification apparatus (notifier) configured to notify the manufacturer of the in-vehicle system, the seller (dealer) of the moving apparatus, and the like of the fact that the moving apparatus 700 has collided with the obstacle. For example, the notification apparatus can use a device that transmits information (collision information) on a collision between the moving apparatus 700 and the obstacle to a preset external notification destination by e-mail or the like.

Thus, when the collision information is automatically notified by the notification apparatus, measures such as the inspection and repair can be immediately taken after the collision. The notification destination of the collision information may be an arbitrary destination set by the user, such as an insurance company, a medical institution, and the police. The notification apparatus may be configured so as to notify not only the collision information but also the failure information of each component and consumption information of consumables. The presence or absence of the collision may be detected by using the distance information acquired based on the output from the imaging unit 1 described above, or by another detector (sensor).

In this description, the in-vehicle system 600 is applied to a driving support (collision damage reduction), but the present invention is not limited to this example, and the in-vehicle system 600 is applicable to the cruise control (including adaptive cruise control) and automatic driving. The in-vehicle system 600 is applicable not only to a vehicle such as an automobile but also to a moving body such as a ship, an aircraft, or an industrial robot. It is applicable not only to the moving body but also to various devices that utilize an object recognition such as an intelligent transportation system (ITS).

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Each of the above examples can provide an optical system having a projection characteristic compatible with the fisheye lens and the telephoto lens, a sufficient angle of view, and a sufficient resolution.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-011187, filed on Jan. 27, 2021, which is hereby incorporated by reference herein in its entirety.

What is claimed is:

1. An optical system comprising, in order from an enlargement conjugate side to a reduction conjugate side:
   a front unit including three or more lenses;
   a diaphragm; and
   a rear unit including a plurality of lenses,
   wherein the three or more lenses include, in order from the enlargement conjugate side to the reduction conjugate side, a first positive lens, a first negative lens, and a second positive lens,
   wherein the first positive lens is closest to an enlargement conjugate position among the three or more lenses,
   wherein a projection characteristic $y(\theta)$ of the optical system that represents a relationship between a half angle of view $\theta$ and an image height $y$ satisfies the following inequality:

$$1.80 \leq f \sin \theta_{max}/y(\theta_{max}) \leq 4.50$$

where $\theta_{max}$ is a maximum half angle of view of the optical system, and f is a focal length of the optical system, and
   wherein the following inequality is satisfied:

$$0.1 \leq |f2/f1| \leq 1.5$$

where f1 is a focal length of the first positive lens, and f2 is a focal length of the first negative lens.

2. The optical system according to claim 1, wherein the first negative lens is adjacent to the first positive lens.

3. The optical system according to claim 1, wherein the second positive lens is adjacent to the diaphragm.

4. The optical system according to claim 1, wherein the three or more lenses include, in order from the enlargement conjugate side to the reduction conjugate side, the first positive lens, the first negative lens, a positive or negative lens, and the second positive lens.

5. The optical system according to claim 4, wherein the rear unit includes, in order from the enlargement conjugate side to the reduction conjugate side, a positive lens, a negative lens, and a positive lens.

6. The optical system according to claim 1, wherein the following inequality is satisfied:

$$0.20 \leq \theta b/\theta_{max} \leq 0.45$$

where $\theta b$ is a half angle of view when a resolution of an equidistant projection $f\theta$ is equal to $y(\theta_{max})/\theta_{max}$.

7. The optical system according to claim 1, wherein the first positive lens has an aspherical surface with a plurality of inflection points.

8. The optical system according to claim 7, wherein the aspherical surface has, in order from an optical axis side to a periphery side, a convex shape facing the enlargement conjugate side, a concave shape facing the enlargement conjugate side, and a convex shape facing the enlargement conjugate side.

9. The optical system according to claim 1, wherein a lens closest to the reduction conjugate position in the rear unit has an aspherical surface with an inflection point.

10. The optical system according to claim 1, wherein the following inequality is satisfied:

$$\theta_{max} \geq 50°.$$

11. An image pickup apparatus comprising:
    the optical system according to claim 1; and
    an image sensor configured to image an object via the optical system.

12. An in-vehicle system comprising:
    the image pickup apparatus according to claim 11;
    a processor; and
    a memory, including instructions stored thereon, which when executed by the processor, cause the system to:
      determine a likelihood of collision between a vehicle and the object based on distance information of the object acquired by the image pickup apparatus.

13. The in-vehicle system according to claim 12, further comprising a control apparatus configured to output a control signal that generates a braking force to a driving unit of the vehicle when it is determined that there is a likelihood of collision between the vehicle and the object.

14. The in-vehicle system according to claim 12, further comprising:
    a processor; and
    a memory, including instructions stored thereon, which when executed by the processor, cause the system to:

warn a user of the vehicle when it is determined that there is a likelihood of collision between the vehicle and the object.

15. The in-vehicle system according to claim 12, further comprising:
  a processor; and
  a memory, including instructions stored thereon, which when executed by the processor, cause the system to:
   notify a user of information on the collision between the vehicle and the object.

16. A moving apparatus comprising the image pickup apparatus according to claim 11 and movable while holding the image pickup apparatus.

17. The moving apparatus according to claim 16, further comprising:
  a processor; and
  a memory, including instructions stored thereon, which when executed by the processor, cause the apparatus to:
   determine a likelihood of collision between a vehicle and the object based on distance information of the object acquired from the image pickup apparatus.

18. The moving apparatus according to claim 17, wherein the instructions, when executed by the processor, further cause the apparatus to:
  output a control signal that generates a braking force to a driving unit of the vehicle when it is determined that there is a likelihood of collision between the vehicle and the object.

19. The moving apparatus according to claim 17, wherein the instructions, when executed by the processor, further cause the apparatus to:
  warn a user of the vehicle when it is determined that there is a likelihood of collision between the vehicle and the object.

* * * * *